US012579559B2

(12) United States Patent
Hewlett, Jr.

(10) Patent No.: US 12,579,559 B2
(45) Date of Patent: Mar. 17, 2026

(54) SYSTEMS AND METHODS FOR USING ARTIFICIAL INTELLIGENCE TO AUDIT DOCUMENTS FOR COMPLIANCE WITH GUIDELINES

(71) Applicant: John Reed Hewlett, Jr., Philadelphia, PA (US)

(72) Inventor: John Reed Hewlett, Jr., Philadelphia, PA (US)

( * ) Notice: Subject to any disclaimer, the term of this patent is extended or adjusted under 35 U.S.C. 154(b) by 0 days.

(21) Appl. No.: 19/041,576

(22) Filed: Jan. 30, 2025

(65) Prior Publication Data

US 2025/0252468 A1 Aug. 7, 2025

Related U.S. Application Data

(60) Provisional application No. 63/616,799, filed on Feb. 5, 2024.

(51) Int. Cl.
*G06Q 30/04* (2012.01)

(52) U.S. Cl.
CPC .................................... *G06Q 30/04* (2013.01)

(58) Field of Classification Search
CPC ...................................................... G06Q 30/04
USPC ............................................................ 705/34
See application file for complete search history.

(56) References Cited

U.S. PATENT DOCUMENTS

| | | | | |
|---|---|---|---|---|
| 11,288,720 | B1 * | 3/2022 | Vasudevan | G06Q 20/14 |
| 11,657,912 | B2 * | 5/2023 | Dunn | G16H 50/70 705/2 |
| 2012/0317006 | A1 * | 12/2012 | Ulrich | G06Q 30/04 705/34 |
| 2014/0129432 | A1 * | 5/2014 | Hanson | G06Q 30/04 705/40 |
| 2021/0319007 | A1 * | 10/2021 | Guggilla | G06Q 10/20 |
| 2023/0154222 | A1 * | 5/2023 | Desai | G06N 7/01 382/100 |
| 2023/0394539 | A1 * | 12/2023 | Pillalamarri | G06Q 30/04 |
| 2024/0144732 | A1 * | 5/2024 | Silva | G07B 15/06 |

(Continued)

FOREIGN PATENT DOCUMENTS

| | | | |
|---|---|---|---|
| AU | 2021106896 | A4 * | 11/2021 |
| TR | 202018781 | A2 * | 4/2021 |
| WO | WO-2023282866 | A2 * | 1/2023 |

(Continued)

*Primary Examiner* — Russell S Glass
(74) *Attorney, Agent, or Firm* — Panitch Schwarze Belisario & Nadel LLP

(57) ABSTRACT

A method for auditing for billing compliance through artificial intelligence includes: training an artificial intelligence (AI) engine using one or more one or more billing guidelines; receiving a billing entry including a reference identifier, amount, and description; instructing the AI engine to audit the billing entry using the billing guidelines; receiving a notification from the AI engine that includes at least one issue of noncompliance, billing guidelines associated with each issue of noncompliance, and at least one recommended revision for each issue of noncompliance; prompting, for each issue of noncompliance in the received notification, a user for acceptance a recommended revision or entry of a user-provided revision; updating the billing entry based on a result of the prompting for each issue of noncompliance; and submitting the updated billing entry for payment.

21 Claims, 5 Drawing Sheets

(56) References Cited

U.S. PATENT DOCUMENTS

2024/0428354 A1* 12/2024 Poon .................. G06Q 30/0283

FOREIGN PATENT DOCUMENTS

WO WO-2023159771 A1 * 8/2023
WO WO-2024105617 A1 * 5/2024
WO WO-2024150191 A1 * 7/2024 ........... G06Q 20/102

* cited by examiner

SYSTEMS AND METHODS FOR USING ARTIFICIAL INTELLIGENCE TO AUDIT DOCUMENTS FOR COMPLIANCE WITH GUIDELINES

FIELD

The present disclosure relates to auditing billing invoices and resolving billing compliance issues, specifically the use of artificial intelligence to evaluate submitted billing invoices against provided billing guidelines.

BACKGROUND

In many service industries, service providers often bill their clients on a regular basis through the use of invoices. In these industries, an invoice can typically involve a number of billing entries, each of which can include details about the related activity for which the entry applies, such as a description, billing code, amount being charged, length of activity, product codes, etc. Many clients, especially those that utilize multiple service providers, can have very detailed billing guidelines that are applicable to invoices being submitted to the client, such as specifying the billing codes that are used, the amounts that can be charged for each code, and specifics regarding the description for a billing entry in order for the charge to be accepted and honored.

In order to help streamline the process, many service providers utilize software programs and other utilities to help generate invoices. These programs can ensure standardization across billing entries in terms of display and entered values, such as by ensuring that a user supplying a new billing entry does not leave an entry field blank and enters a time amount in a specific format. However, these programs are often agnostic as to client billing guidelines. In cases where a program does offer the ability to customize invoices to specific clients, the customizations are often very limited and require programming to be entered by the service provider in order to be effective. Thus, there is a need for a technological improvement to computing systems to improve the invoice process to ensure compliance with billing guidelines with minimal user involvement and maintenance.

SUMMARY

The present disclosure provides a description of systems and methods for auditing and billing compliance by using artificial intelligence. Billing guidelines for a client are used to train an artificial intelligence (AI) engine. When a new invoice is created, the AI engine is applied to the billing entries and analyzes the entries for compliance with the provided billing guidelines. For any entries where non-compliance is detected, the AI engine identifies the portion of the guideline where the entry is non-compliant and provides recommendations as to how to get the entry into compliance with the billing guidelines. The recommendations can be accepted by the user, or other revisions can be made by the user, and the billing entries in the invoice are updated accordingly. Once the invoice has been updated and is in compliance with the billing guidelines, it can be submitted to the client. The result is a system that can enforce compliance with billing guidelines and audit supplied billing invoices without requiring any special instructions by users and be updated instantly for any changes in billing guidelines.

A method for auditing for billing compliance through artificial intelligence includes: training, by processor of a processing server, an artificial intelligence (AI) engine, using one or more data files comprising one or more billing guidelines; receiving, by a receiver of the processing server, one or more billing entries, each of the one or more billing entries including at least a reference identifier, an amount, and a description; instructing, by the processor of the processing server, the AI engine to audit the billing entry using the one or more billing guidelines; receiving, by the receiver of the processing server, a notification from the AI engine that includes at least one issue of noncompliance, at least one of the one or more billing guidelines associated with each issue of noncompliance, and at least one recommended revision for each issue of noncompliance; prompting, by the processor of the processing server and for each issue of noncompliance in the received notification, a user for acceptance of one of the at least one recommended revision or entry of a user-provided revision; updating, by the processor of the processing server, the one or more billing entries based on a result of the prompting for each issue of noncompliance; and submitting, by a transmitter of the processing server, the updated one or more billing entries for payment.

A system for auditing for billing compliance through artificial intelligence includes an artificial intelligence (AI) engine and a processing server including at least a receiver, a processor, and a transmitter, wherein: the processor of the processing server trains the AI engine using one or more data files comprising one or more billing guidelines; the receiver of the processing server receives one or more billing entries, each of the one or more billing entries including at least a reference identifier, an amount, and a description; the processor of the processing server instructs the AI engine to audit the one or more billing entries using the one or more billing guidelines; the receiver of the processing server receives a notification from the AI engine that includes at least one issue of noncompliance, at least one of the one or more billing guidelines associated with each issue of noncompliance, and at least one recommended revision for each issue of noncompliance; the processing server of the processing server prompts, for each issue of noncompliance in the received notification, a user for acceptance of one of the at least one recommended revision or entry of a user-provided revisions, and updates the one or more billing entries based on a result of the prompting for each issue of noncompliance; the transmitter of the processing server submits the updated one or more billing entries for payment. Each issue of identified noncompliance is displayed in a centralized dashboard or interface to be utilized by the user to resolve the compliance issue and which displays details related to the audit, as well as the status of resolution.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments is intended for illustration purposes only and are, therefore, not intended to necessarily limit the scope of the disclosure.

DETAILED DESCRIPTION

System for Auditing and Billing Compliance Using Artificial Intelligence

Figure 1:
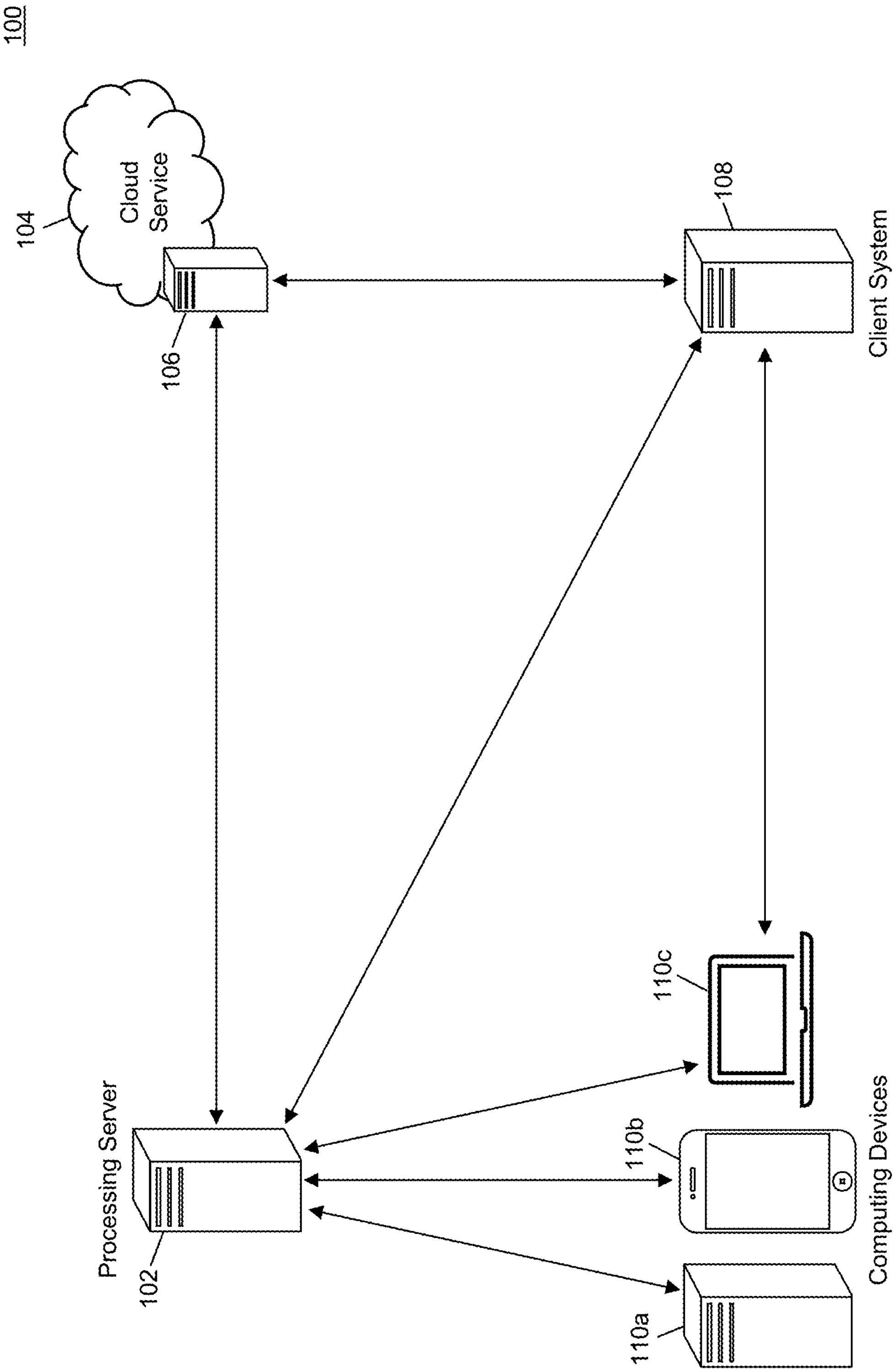
FIG. 1 is a block diagram illustrating a high level system architecture for auditing billing compliance through artificial intelligence in accordance with exemplary embodiments.

FIG. 1 illustrates a system 100 for the auditing of billing invoices and resolving billing issues through the use of artificial intelligence and supplied billing guidelines.

The system 100 can include a processing server 102. The processing server 102, discussed in more detail below, can be a computing system configured to perform the functions discussed herein for enabling the auditing of billing invoices and the resolution of billing issues in accordance with billing guidelines through the use of an artificial intelligence (AI) engine. The AI engine can be an engine that is trained through one or more data sets and utilizes artificial intelligence to analyze data and generate results based thereon, such as, in the system 100, whether or not a billing entry in an invoice is in compliance with applicable billing guidelines. Alternatively, the AI engine can be an existing AI engine and the system 100 may utilize prompt engineering based on one or more datasets, e.g., billing guidelines and billing data, to generate tailored inputs into the existing AI engine to get desired outputs, e.g., whether or not a billing entry in an invoice is in compliance with applicable billing guidelines. The AI engine can be locally stored on the processing server 102 or stored in one or more databases directly accessible by the processing server 102 or stored remotely to the processing server 102 and accessible thereby using one or more suitable communication networks and methods. In latter instances, the AI engine can be accessed by the processing server 102 via a cloud service 104. The cloud service 104 can be a computing service that provides data storage and computing resources for access by computing systems remotely, such as those offered by Amazon Web Services, Cloudflare, Microsoft Azure, Google Cloud Platform, Salesforce Cloud, etc. In such instances, the processing server 102 can access the AI engine discussed herein via one or more service systems 106, as illustrated in FIG. 1.

As discussed herein, a service provider can be interested in utilizing the processing server 102 to ensure that invoices submitted by the service provider to a client are in compliance with billing guidelines set forth by the client. Similarly, the client or a third party such as an auditor or government agency can utilize the processing server 102 to ensure that invoices submitted by the service provider to a client comply with the client's billing guidelines. In the system 100, a client system 108 that is a computing system operated by or otherwise associated with a client of a service provider can provide billing guidelines to the service provider. The billing guidelines can include a plurality of different guidelines that are applicable to invoices and/or billing entries included therein. For example, billing guidelines can include possible billing codes that can be used, amounts that can be charged for each billing code, formatting rules for time entry, requirements for descriptions for billing entries for different billing codes, limits on the number of billing entries per invoice, limits on the total payment amount for an invoice, requirements regarding the frequency of invoice submissions, etc. Billing guidelines can be provided by the client system 108 in a data file that is in a format suitable for opening by the AI engine or can be in a different format that can be converted into a format suitable for opening by the AI engine by the service provider and/or the processing server 102.

In the system 100 illustrated in FIG. 1, the service provider is illustrated via computing devices 110. Each computing device 110, illustrated in FIG. 1 as computing devices 110*a*, 110*b*, and 110*c* can be a computing device operated by or otherwise associated with the service provider that can be used by a user of the service provider to interact with the processing server 102 for use of the functions provided thereby for auditing of billing invoices and resolving of billing issues. A computing device 110 can receive the billing guidelines for the client from the client system 108 using a suitable communication network and method, such as via e-mail, a multimedia messaging service message, a file sharing website, file hosting platform etc.

In order to utilize the processing server 102 for auditing invoices, the computing device 110 can electronically transmit the billing guidelines to the processing server 102 using any suitable communication network and method. For instance, the processing server 102 can offer a webpage, application program, or other interface for service providers to interact with the processing server 102 in order to submit, update, or remove billing guidelines, request auditing of invoices, and other functions discussed herein. As discussed herein, data exchanged between the processing server 102 and computing devices 110 can use such an interface, where communications can be facilitated using any suitable communication network, such as the Internet. For example, each issue of identified noncompliance, as discussed in more detail below, can be displayed in a centralized dashboard or interface to be utilized by the user to resolve the compliance issue and which displays details related to the audit, as well as the status of resolution.

The processing server 102 can receive the billing guidelines from the computing device 110. In some cases, the computing device 110 can also provide identifying information for the billing guidelines, such as in instances where the computing device 110 may provide billing guidelines for multiple clients, where the identifying information can be used by the processing server 102 and AI engine to determine the applicable guidelines for a particular invoice. In such cases, invoices provided by the computing system 110 can include the identifying information for the applicable billing guideline, such as a customer number, client number, guideline identification value, etc. If a computing device 110 receives updated billing guidelines from a client system 108, the computing device 110 can also provide the updated billing guidelines to the processing server 102 along with the identifying information, which can enable the processing server 102 to update the billing guidelines in the AI engine accordingly. Further, the processing server 102 can receive past billing data from the computing device 110. For example, the computing device 110 may transmit invoices that were previously accepted as being in compliance with an applicable billing guideline for a client, e.g., the client system 108.

In some embodiments, the processing server 102 can communicate with a client system 108 directly using a suitable communication network and method. In such embodiments, the client system 108 can provide its billing guidelines directly to the processing server 102, which the processing server 102 can then use to train the AI engine, as discussed below. If the client system 108 updates its billing guidelines, the client system 108 can provide the new billing guidelines or information regarding the updates to the billing guidelines (e.g., a changelog) to the processing server 102 for use in updating the training of the AI engine. In these embodiments, the processes discussed herein can be further streamlined, and added benefit provided to client systems 108 by ensuring that all billing guidelines are up to date, especially in cases where a client can use several different service providers. In some instances, a single client system 108 may have different billing guidelines for different service providers. In such instances, each billing guideline can have its own identifying information as well as a unique identification value associated with the client system 108.

Once the processing server 102 has received a set of billing guidelines and/or past billing data, the processing server 102 can process the billing guidelines and/or past billing data to generate training data for the AI engine. The processing server 102 may pre-process the billing guidelines and/or past billing data to, e.g., remove inaccuracies, remove duplicates, remove inconsistencies, combine data from different sources, remove irrelevant data, label data, and convert data to a suitable format, etc., prior to use in training the AI engine. For example, the processing server 102 may identify and remove duplicate billing guidelines, identify and remove duplicate invoices, identify and remove rejected invoices, remove irrelevant data from the past billing data, e.g., letterheads, cover pages, logos, etc. Further, the processing server 102 may create more data as part of the pre-processing to generate a training dataset of appropriate size for the AI engine. For example, the processing server 102 may generate additional billing guidelines and invoices in compliance with the additional billing guidelines. The processing server 102 may divide the pre-processed data into a training dataset, and a validation dataset. The training dataset is used to generate and train the AI engine, and the validation dataset is used to verify the accuracy of the trained AI engine and fine tune any parameters of the AI engine. The processing server 102 may also generate a testing dataset to test the trained AI engine. For example, the processing server 102 may generate an invoice for a particular client system 108 including a billing code and a billing amount that exceeds the billing guideline of the client system 108 for that billing code and the processing server 102 may input the generated invoice into the AI engine to determine if the AI engine can identify the error and generate an appropriate query as discussed in more detail below. If the AI engine cannot identify the error, the processing server 102 may further train and fine tune the parameters of the AI engine until a suitable amount of testing data is successfully analyzed by the AI engine. Once the billing guidelines and/or past billing data have been pre-processed as training data, the processing server 102 may then input the training dataset into the AI engine. The un-trained AI engine may be a neural network, e.g., a large language model (LLM), or any other suitable AI engine type for analyzing invoices for compliance with one or more billing guidelines and outputting one or more queries/recommendations as discussed in more detail below. The AI engine can be configured to read, analyze, and process the training dataset that comprises the billing guidelines and/or past billing data for use thereof in future analyses using methods that will be apparent to persons having skill in the relevant art. The AI engine can store a copy of the billing guidelines and/or past billing data along with any associated identifying information for direct reference when performing analysis, providing notifications of non-compliance, and generating recommendations for remediation for a non-compliant invoice or billing entry. In an embodiment, the processing server 102 can process the billing guidelines and/or past billing data utilizing a prompt engineering process to generate an input for an existing AI engine, e.g., ChatGPT, as discussed in more detail below.

Once billing guidelines have been input into an AI engine by the processing server 102, the processing server 102 can notify the service provider, via a computing device 110, that new billing entries and/or invoices can be submitted thereto for auditing and issue resolution. The processing server 102 can provide, via its platform to the service provider, an opportunity for a computing device 110 to submit new billing entries and/or invoices using any suitable method, such as direct submission via a form available on a webpage or an application program, or by enabling the computing device 110 to provide a data file, such as a word processing document, a portable document file, etc., which can be read and parsed by the processing server 102 to identify billing entries and/or invoice data included therein. In the example implementation discussed herein, a billing entry can be a single entry for which payment is requested, while an invoice can include one or more billing entries as well as additional information regarding payment being requested by a service provider. However, additional alternatives of any suitable manner for requesting payment can be utilized using the methods and systems discussed herein.

A computing device 110 can provide an invoice that includes invoice data, such as identifying information for the client system 108 and the specific billing guidelines that apply to the invoice, and a plurality of billing entries. Each billing entry can include a description, reference identifier, amount, and any other suitable information. The description can be a textual explanation of the action or item for which the client is being charged, the reference identifier can be a billing code, product code, and/or other value recognizable by the client regarding the action or item for which the client is being charged, and the amount can include one or more values for use in determining the payment being charged to the client, such as the full payment amount, units of time worked, quantity of items purchased, payment rate, etc. In an illustrative example, the service provider can be a law firm that provides legal services to a client. The invoice can include a client identifier (e.g., Smart Insurance Co.), matter number (e.g., Matter No. 25366), and a date for the invoice (e.g., Sep. 10, 2024), while a billing entry in the invoice can include time units (e.g., 1.2 hours), an hourly rate (e.g., $300.00/hour), total payment amount (e.g., $360.00), a billing code (e.g., DOCREVIEW), and a description (e.g., "Review plaintiff's expert report of Dr. Arnold Jones"). Invoices and billing entries can include additional and/or alternative data depending on the client, service provider, and industry for which the methods and systems discussed herein are being used. For instance, the processing server 102 can provide auditing and compliance services in the legal industry, manufacturing, construction, engineering, logistics, healthcare, etc.

Once an invoice has been received, the invoice can be input into the AI engine by the processing server 102 for analysis. The AI engine can analyze the invoice and each of the data values in each billing entry included therein against the applicable billing guidelines to determine compliance for the invoice and each billing entry included therein. Each time the AI engine identifies a potential issue, the AI engine can generate a notification for presentation to the service provider regarding the potential issue. The notification, referred to herein as a "query," can include the billing entry or invoice where potential non-compliance was identified, a reason the AI engine determined the billing entry or invoice to be non-compliant, the applicable billing guideline that provided the basis for the determination, and/or one or more recommendations to remediate the non-compliance. In some cases, the notification can indicate if the non-compliance can affect the hourly rate or payment amount. In the above example, the AI engine can generate a query that indicates that the billing entry is non-compliant that includes the applicable billing guideline (e.g., Guideline A.2.III), the reason the billing entry was determined to be non-compliant (e.g., "Per Guideline A.2.III, the service provider must emphasize tasks that go beyond basic review and demonstrate the necessity of attorney expertise and specify the number of pages reviewed or the extent of materials"), and a recommendation of a revised description that is in compliant with the applicable regulation (e.g., "Conducted legal analysis of plaintiff's expert report by Dr. Arnold Jones (approx. 30 pages) to assess the extent of plaintiff's damages and impact on case strategy").

In an embodiment, the processing server 102 may utilize a prompt engineering process, e.g., retrieval-augmented generation (RAG), to input the billing guidelines and/or past billing data into an existing AI engine, e.g., ChatGPT, for analysis. In such embodiments, the generation and training of a new AI engine is not necessary. The processing server 102 may store the billing guidelines and/or the billing data in a database, e.g., the billing database 206 and/or the artificial intelligence database 210, and utilize the billing guidelines and/or the billing data as part of the input query into the AI engine. The database, e.g., the billing database 206 and/or the artificial intelligence database 210, may be a vector database used to store documents, e.g., billing guidelines and billing data, as embeddings in a high-dimensional space, to enable the processing server 102 to retrieve relevant data and generate a clear and focused input query. For example, the processing server 102 may generate a query such as "generate an invoice for [insert billing data] that is in compliance with [insert billing guidelines]."

In embodiments, the processing server 102 may utilize a combination of generating and training a new AI engine and a prompt engineering process. For example, the processing server 102 may generate and train an AI engine as discussed above and utilize newly acquired data, e.g., acquired after the AI engine has been trained, as input into the trained AI engine to enhance the output of the AI engine.

Once the AI engine, either generated and trained by the processing server 102 or an existing AI engine via prompt engineering, has analyzed the invoice, it can provide all generated queries to the processing server 102. The processing server 102 can make the queries available to the computing device 110 for review using its platform. In some cases, the processing server 102 can prompt the computing device 110 to address each of the received queries. A user of the service provider can, via the computing device 110, review a query and request that the associated invoice or billing entry be updated. The user can choose to accept one of the recommended modifications indicated in the query or provide a custom modification. In some cases, if a custom modification is provided, the updated billing entry or invoice can be resubmitted to the AI engine for analysis to ensure that the recommendation satisfies the applicable billing guideline and is compliant with all other billing guidelines. In the above example, the user can accept the recommended revised description. In embodiments, the query may not include a recommended modification, and the user can instruct the AI engine, e.g., via the processing server 102, to instruct the AI engine to generate one or more recommended modifications to address the identified non-compliance issues. In such cases, the processing server 102 can present the generated recommended modifications to the user for review and/or approval, e.g., via the computing device 110.

When a user provides a response to a prompt for a query, the processing server 102 can update the billing entry or invoice accordingly. In some cases, the query can be deleted or otherwise made unavailable to the computing device 110. In other cases, the query can remain available for review by a user of a computing device 110, but can be indicated as resolved, where viewing of the query can also display the action taken for resolution of the query (e.g., the selected recommendation by the AI engine or the custom modification input by the user). Once all queries associated with a particular invoice have been resolved, the invoice can then be submitted to the client system 108 for processing for payment. In some cases, the updated, compliant invoice can be submitted to the client system 108 by a computing device 110 of the service provider, where the updated, compliant invoice can be available to the computing device 110 via the platform of the processing server 102. In other cases, the processing server 102 can directly submit the updated, compliant invoice to the client system 108 using a suitable communication network and method.

In some embodiments, the client system 108 or a computing device 110 can provide further updates to queries, which can be used to further train the AI engine for the associated billing guidelines. For example, if an updated billing guideline that used a recommendation by the AI engine is accepted by the client system 108, the acceptance can be indicated, which can be used by the AI engine in future recommendations. In another example, if the client system 108 rejected a billing entry or made further changes to a billing entry, the rejection or those changes can be provided to the AI engine along with the applicable billing entry or invoice, which the AI engine can take into account in future recommendations. For example, the changes made by the client system 108 can be used in an engineered prompt for input into the AI engine as discussed in more detail above.

The methods and systems discussed herein provide for auditing of bills and invoices and ensuring compliance with all applicable billing guidelines through artificial intelligence. By using a separate processing system that utilizes an AI engine, a service provider can ensure that all billing entries and invoices are in compliance with a client's billing guidelines without the need for any programming or manual review of the billing guidelines. Furthermore, because the AI engine can also provide recommendations, non-compliant entries can be immediately resolved without the need for the service provider to manually review the guidelines, which can be a difficult and time-consuming process. The result is a system that efficiently ensures compliance with billing guidelines with minimal user action through the use of improved computing systems and advanced technologies that provides a significant improvement in efficiency and accuracy at significantly reduced onboarding and maintenance costs.

Processing Server

Figure 2:
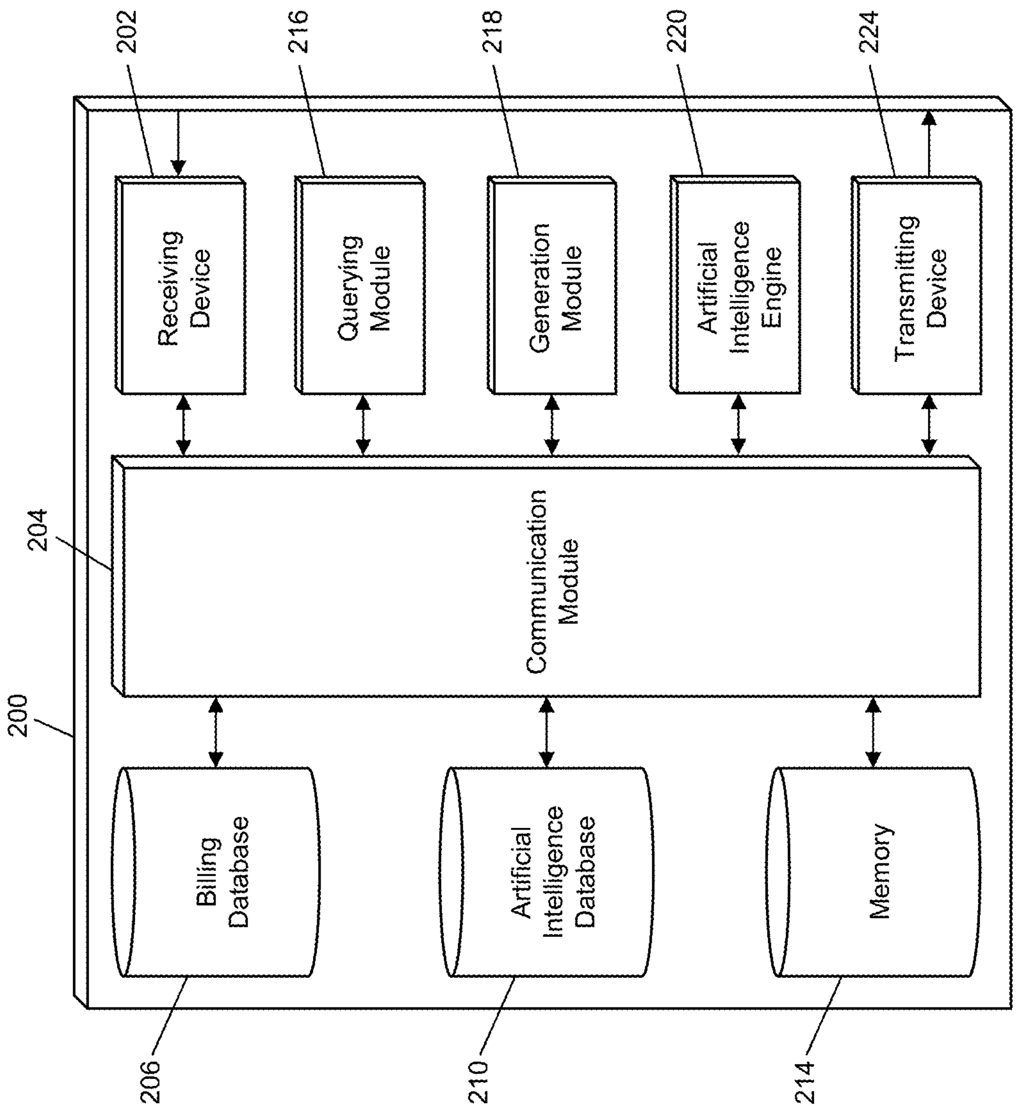
FIG. 2 is a block diagram illustrating a processing server in the system of FIG. 1 for auditing billing compliance through artificial intelligence in accordance with exemplary embodiments.

FIG. 2 illustrates an embodiment of the processing server 102 in the system 100 of FIG. 1. It will be apparent to persons having skill in the relevant art that the embodiment of the processing server 102 illustrated in FIG. 2 is provided as illustration only and cannot be exhaustive to all possible configurations of the processing server 102 suitable for performing the functions as discussed herein. For example, the computer system 500 illustrated in FIG. 5 and discussed in more detail below can be a suitable configuration of the processing server 102.

The processing server 102 can include a receiving device 202. The receiving device 202 can be configured to receive data over one or more networks via one or more network protocols. In some instances, the receiving device 202 can be configured to receive data from service systems 106, client systems 108, computing devices 110, and other systems and entities via one or more communication methods, such as radio frequency, local area networks, wireless area networks, cellular communication networks, Bluetooth, the Internet, etc. In some embodiments, the receiving device 202 can be comprised of multiple devices, such as different receiving devices for receiving data over different networks, such as a first receiving device for receiving data over a local area network and a second receiving device for receiving data via the Internet. The receiving device 202 can receive electronically transmitted data signals, where data can be superimposed or otherwise encoded on the data signal and decoded, parsed, read, or otherwise obtained via receipt of the data signal by the receiving device 202. In some instances, the receiving device 202 can include a parsing module for parsing the received data signal to obtain the data superimposed thereon. For example, the receiving device 202 can include a parser program configured to receive and transform the received data signal into usable input for the functions performed by the processing device to carry out the methods and systems described herein.

The receiving device 202 can be configured to receive data signals electronically transmitted by service systems 106 that are superimposed or otherwise encoded with AI engine data, billing queries, data requests, training prompts, etc. The receiving device 202 can also be configured to receive data signals electronically transmitted by client systems 108, which can be superimposed or otherwise encoded with billing guideline data files, billing entry feedback, audit requests, billing guideline updates, billing guideline changelogs, etc. The receiving device 202 can also be configured to receive data signals electronically transmitted by computing devices 110, which can be superimposed or otherwise encoded with billing guideline data files, billing entry feedback, audit requests, billing guideline updates, billing guideline changelogs, invoices, billing entries, query responses, etc.

The processing server 102 can also include a communication module 204. The communication module 204 can be configured to transmit data between modules, engines, databases, memories, and other components of the processing server 102 for use in performing the functions discussed herein. The communication module 204 can be comprised of one or more communication types and utilize various communication methods for communications within a computing device. For example, the communication module 204 can be comprised of a bus, contact pin connectors, wires, etc. In some embodiments, the communication module 204 can also be configured to communicate between internal components of the processing server 102 and external components of the processing server 102, such as externally connected databases, display devices, input devices, etc. The processing server 102 can also include a processing device. The processing device can be configured to perform the functions of the processing server 102 discussed herein as will be apparent to persons having skill in the relevant art. In some embodiments, the processing device can include and/or be comprised of a plurality of engines and/or modules specially configured to perform one or more functions of the processing device, such as a querying module 216, generation module 218, AI engine 220, etc. As used herein, the term "module" can be software or hardware particularly programmed to receive an input, perform one or more processes using the input, and provides an output. The input, output, and processes performed by various modules will be apparent to one skilled in the art based upon the present disclosure.

The processing server 102 can also include a billing database 206. The billing database 206 can be configured to store data using a suitable data storage format and schema. The billing database 206 can be a relational database that utilizes structured query language for the storage, identification, modifying, updating, accessing, etc. of structured data sets stored therein. Data stored in the billing database 206 can include, for example, billing guidelines, reference identifiers, identifying information, invoices, billing entries, queries, prompt responses, change histories, etc.

The processing server 102 can also include an artificial intelligence (AI) database 210. The AI database 210 can be configured to store data using a suitable data storage format and schema. The AI database 210 can be a relational database that utilizes structured query language for the storage, identification, modifying, updating, accessing, etc. of structured data sets stored therein. Data stored in the AI database 210 can include, for example, the AI engine, training data, validation data, testing data, communication information for the cloud service 104 and/or service systems 106, formatting rules, prompt history, etc.

The processing server 102 can also include a memory 214. The memory 214 can be configured to store data for use by the processing server 102 in performing the functions discussed herein, such as public and private keys, symmetric keys, etc. The memory 214 can be configured to store data using suitable data formatting methods and schema and can be any suitable type of memory, such as read-only memory, random access memory, etc. The memory 214 can include, for example, encryption keys and algorithms, communication protocols and standards, data formatting standards and protocols, program code for modules and application programs of the processing device, and other data that can be suitable for use by the processing server 102 in the performance of the functions disclosed herein as will be apparent to persons having skill in the relevant art. In some embodiments, the memory 214 can be comprised of or can otherwise include a relational database that utilizes structured query language for the storage, identification, modifying, updating, accessing, etc. of structured data sets stored therein.

The processing server 102 can include a querying module 216. The querying module 216 can be configured to execute queries on databases to identify information. The querying module 216 can receive one or more data values or query strings and can execute a query string based thereon on an indicated database, such as the billing database 206 of the processing server 102 to identify information stored therein.

The querying module 216 can then output the identified information to an appropriate engine or module of the processing server 102 as necessary. The querying module 216 can, for example, execute a query on the billing database 206 to identify all unresolved queries associated with a specific invoice based on a request received from a computing device 110 (e.g., via the receiving device 202) for display to and resolution by a user of the computing device 110.

The processing server 102 can also include a generation module 218. The generation module 218 can be configured to generate data for use by the processing server 102 in performing the functions discussed herein. The generation module 218 can receive instructions as input, can generate data based on the instructions, and can output the generated data to one or more modules of the processing server 102. For example, the generation module 218 can be configured to generate and/or update invoices or billing entries, generate prompt responses for AI engine training, generate queries for use by the querying module 216 in accessing and/or updating data, etc.

The processing server 102 can also include an AI engine 220. The AI engine 220 can be an AI engine that is trained via billing guidelines and/or prompt engineering that can be used to analyze invoices and billing entries for compliance with billing guidelines. The AI engine 220 can be configured to identify instances where an invoice or billing entry may be non-compliant with one or more guidelines in the billing guidelines, generate reasons for determining that the invoice or billing entry may be non-compliant, generate one or more recommendations for remediation of the non-compliance, and generate a query that includes the above data for presentation to a user. The AI engine 220 can also be configured to update billing guidelines based on changes thereto and update other aspects of the engine based on additionally provided data, such as feedback to queries for a specific set of billing guidelines.

The processing server 102 can also include a transmitting device 224. The transmitting device 224 can be configured to transmit data over one or more networks via one or more network protocols. In some instances, the transmitting device 224 can be configured to transmit data to service systems 106, client systems 108, computing devices 110, and other entities via one or more communication methods, local area networks, wireless area networks, cellular communication, Bluetooth, radio frequency, the Internet, etc. In some embodiments, the transmitting device 224 can be comprised of multiple devices, such as different transmitting devices for transmitting data over different networks, such as a first transmitting device for transmitting data over a local area network and a second transmitting device for transmitting data via the Internet. The transmitting device 224 can electronically transmit data signals that have data superimposed that can be parsed by a receiving computing device. In some instances, the transmitting device 224 can include one or more modules for superimposing, encoding, or otherwise formatting data into data signals suitable for transmission.

The transmitting device 224 can be configured to electronically transmit data signals to service systems 106 that can be superimposed or otherwise encoded with billing guidelines, billing guideline updates, billing guideline changelogs, query feedback, prompt responses, etc. The transmitting device 224 can also be configured to electronically transmit data signals to client systems 108, which can be superimposed or otherwise encoded with requests for updated billing guidelines, invoices, billing entries, data requests, feedback requests, etc. The transmitting device 224 can also be configured to electronically transmit data signals to computing devices 110 that can be superimposed or otherwise encoded with data requests, billing queries, feedback requests, query prompts, etc.

Process for Auditing Billing Invoices Using Artificial Intelligence

Figure 3:
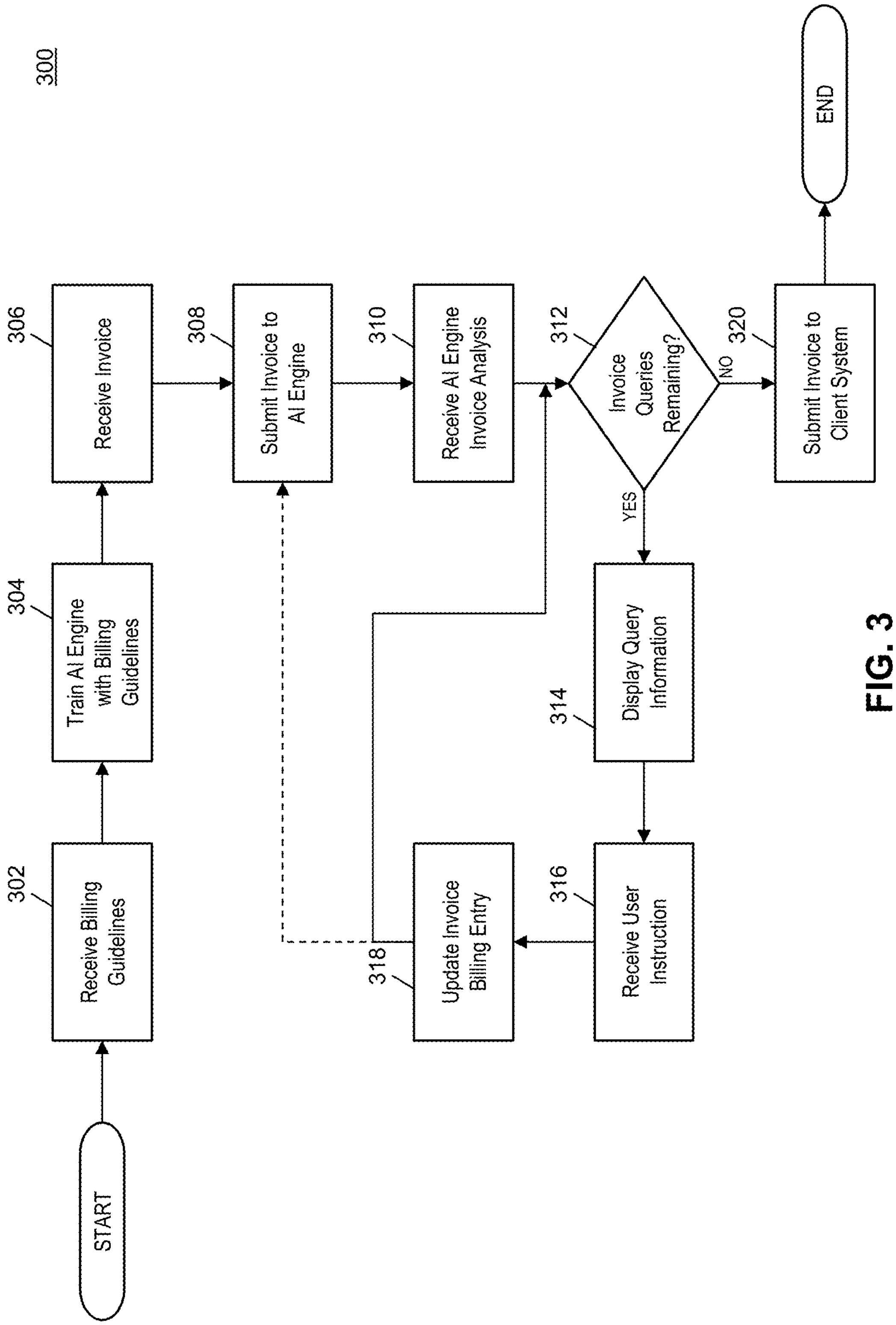
FIG. 3 is a flow diagram illustrating a process for auditing billing compliance through artificial intelligence in the system of FIG. 1 in accordance with exemplary embodiments.

FIG. 3 illustrates a process 300 in the system 100 of FIG. 1 for the auditing of an invoice submitted by a service provider via a computing device 110 for compliance with billing guidelines provided by a client system 108 via the use of an artificial intelligence (AI) engine, such as provided via a cloud service 104.

In step 302, the receiving device 202 of the processing server 102 can receive a data file that includes one or more billing guidelines applicable to all invoices and/or billing entries submitted by a service provider to a client for payment. The processing server 102 can receive the data file from a computing device 110 of the service provider or directly from the client system 108 of the client. In step 304, the processing server 102 can format the data file to be in a suitable format for acceptance by the AI engine, if necessary, and input the data file into the AI engine for training thereof. The AI engine can analyze the data file and update any necessary data storage, components, and functions thereof based on the billing guidelines included therein. In embodiments utilizing prompt engineering, the process 300 may skip step 304 and proceed to step 306 from step 302.

In step 306, the receiving device 202 of the processing server 102 can receive an invoice submitted by a computing device 110 through the platform provided by the processing server 102. The invoice can include one or more invoice data values as well as one or more billing entries, where each billing entry can include at least an amount, reference identifier, and description. In step 308, the processing server 102 can submit the invoice to the AI engine for analysis, such as using the communication module 204 in cases where the AI engine is stored locally on and executed by the processing server 102, or via the transmitting device 224 in cases where the AI engine is stored in a cloud service 104 and executed by a service system 106 thereof. The AI engine can analyze the received invoice utilizing the billing guidelines. In embodiments, step 308 can include generating an engineered prompt, e.g., a retrieval-augmented generation (RAG) prompt, based on the received billing guidelines and the received invoice, as discussed in more detail above.

In step 310, the receiving device 202 of the processing server 102 can receive the results of the analysis from the AI engine. In instances where the AI engine identifying any issue of non-compliance, the results can include a query for each identified issue of non-compliance, where each query can include at least the issue of non-compliance, one or more of the applicable billing guidelines associated with the issue of non-compliance, and at least one recommended revision for the issue of non-compliance. In step 312, the processing server 102 can determine if there are any queries associated with the invoice that still need to be resolved. If there are queries for the invoice that were received in step 310 that have not been addressed by the service provider, then, in step 314, the information included in an unaddressed query can be electronically transmitted by the transmitting device 224 of the processing server 102 to the computing device 110 for display to a user thereof. The user can review the issue of non-compliance indicated in the query, the applicable one or more billing guidelines, and the recommendation(s) provided by the AI engine to address the issue of non-compliance. The user can select to accept the recommendation or provide their own resolution to the issue of non-compliance, which, in some cases, can include submitting the billing entry without any modifications. In step 316, the receiving device 202 of the processing server 102 can receive the user's selection for the displayed query.

In step 318, the generation module 218 of the processing server 102 can update the billing entry to which the query applies by modifying one or more data values in the billing entry based on the received user instructions, such as by updated the description for the billing entry in accordance with the recommendation made by the AI engine that was selected by the user. In some instances, if the user provided a custom modification to the billing entry different from the recommended modification provided by the AI engine, the process 300 can return to step 308 where the updated billing entry can be submitted to the AI engine for repeated analysis to determine if the custom modification resolved the issue of non-compliance.

Once the query has been addressed, the processing server 102 can update the status of the query (e.g., in the billing database 206) and return to step 312 to determine if any more queries still need to be addressed. Once all queries have been addressed, or, if the analysis received in step 310 did not include any queries (e.g., the AI engine determined the invoice and all billing entries to be compliant with all billing guidelines), the process 300 can proceed to step 320. In step 320, the transmitting device 224 of the processing server 102 can submit the invoice, including all updates to the invoice itself and any billing entries included therein, to the client system 108 using a suitable communication network and method. The client system 108 can then process the invoice using suitable methods and tender payment to the service provider accordingly.

Exemplary Method for Auditing for Billing Compliance

Figure 4:
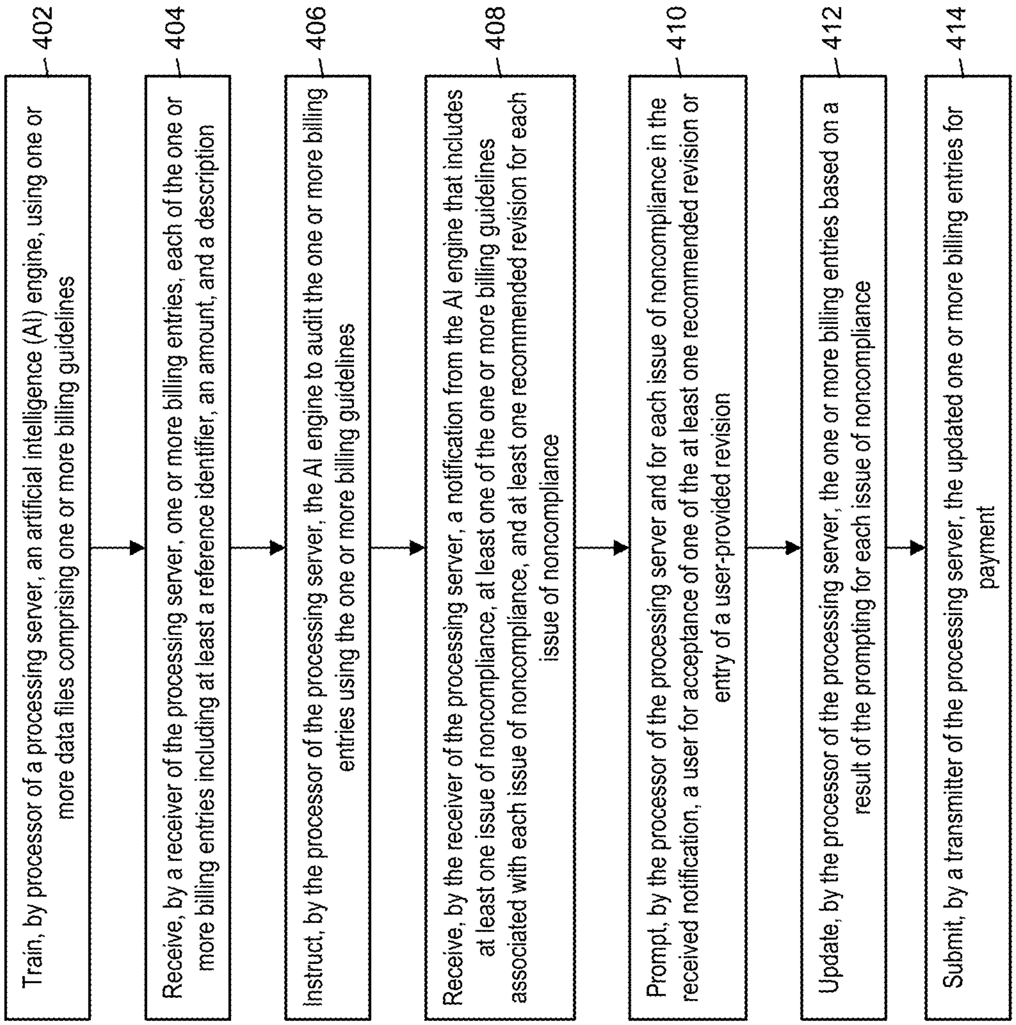
FIG. 4 is a flow chart illustrating an exemplary method for auditing billing compliance through artificial intelligence in accordance with exemplary embodiments.

FIG. 4 illustrates a method 400 for the auditing of billing compliance and resolution of billing issues through artificial intelligence.

In step 402, a processor of a processing server (e.g., processing server 102) can train an artificial intelligence (AI) engine (e.g., AI engine 220) using one or more data files comprising one or more billing guidelines. In embodiments, a processor of a processing server (e.g., processing server 102) can utilize an existing AI engine and prompt engineering methods to obtain the desired outputs. In such embodiments, the method 400 may omit step 402 and start at step 404. In step 404, one or more billing entries, each including at least a reference identifier, an amount, and a description can be received by a receiver (e.g., receiving device 202) of the processing server (e.g., processing server 102). The one or more billing entries can comprise an invoice. In step 406, the AI engine can be instructed by the processor (e.g., communication module 204) of the processing server (e.g., processing server 102) to audit the one or more billing entries using the one or more billing guidelines. In embodiments where the processor of the processing server (e.g., processing server 102) is utilizing prompt engineering and an existing AI engine, step 404 can further include the processor (e.g., the generation module 218) of the processing server generating an input query based on the one or more billing entries and the one or more billing guidelines. In step 408, a notification can be received by the receiver (e.g., the receiving device 202) of the processing server (e.g., processing server 102) from the AI engine that includes at least one issue of noncompliance, at least one of the one or more billing guidelines associated with each issue of noncompliance, and at least one recommended revision for each issue of noncompliance.

In step 410, the processor of the processing server (e.g., processing server 102) can prompt a user, for each issue of noncompliance in the received notification, for acceptance of one of the at least one recommended revision or entry of a user-provided revision. In step 412, the processor (e.g., generation module 218) of the processing server (e.g., processing server 102) can update the one or more billing entries based on a result of the prompting for each issue of noncompliance. In step 414, the updated one or more billing entries can be submitted by a transmitter (e.g., transmitting device 224) of the processing server (e.g., processing server 102) for payment.

In one embodiment, the receiving at least one recommended revision for each issue of noncompliance in step 408 can be in response to an instruction to the AI engine, generated by the processor (e.g., generation module 218) of the processing server (e.g., processing server 102), requesting the at least one recommended revision for each issue of noncompliance.

In one embodiment, the amount can be one of: a total payment amount, a payment rate, and a number of time units worked. In some embodiments, the method 400 can further include generating, by the processor (e.g., generation module 218) of the processing server, an invoice including a plurality of billing entries including a common reference identifier, wherein the plurality of billing entries can include the updated one or more billing entries, and submitting the updated one or more billing entries can comprise submitting the generated invoice including the updated one or more billing entries. In one embodiment, the reference identifier can be one of: an invoice number, a customer number, and a billing code. In some embodiments, the notification can further include an indication that the one or more billing entries is ineligible for compensation at the included amount due to the at least one issue of noncompliance.

In one embodiment, the notification can further include a descriptor for each recommended revision for each issue of noncompliance indicating how the recommended revision is in compliance with the associated one or more billing guidelines. In some embodiments, the method 400 can also include: repeating the instructing step after updating the billing entry; and continuing to repeat the receiving, prompting, and updating steps until a notification is received from the AI engine indicating no remaining issues of noncompliance. In a further embodiment, repeating the instructing step can occur only when entry of a user-provided revision is performed during prompting.

Computer System Architecture

Figure 5:
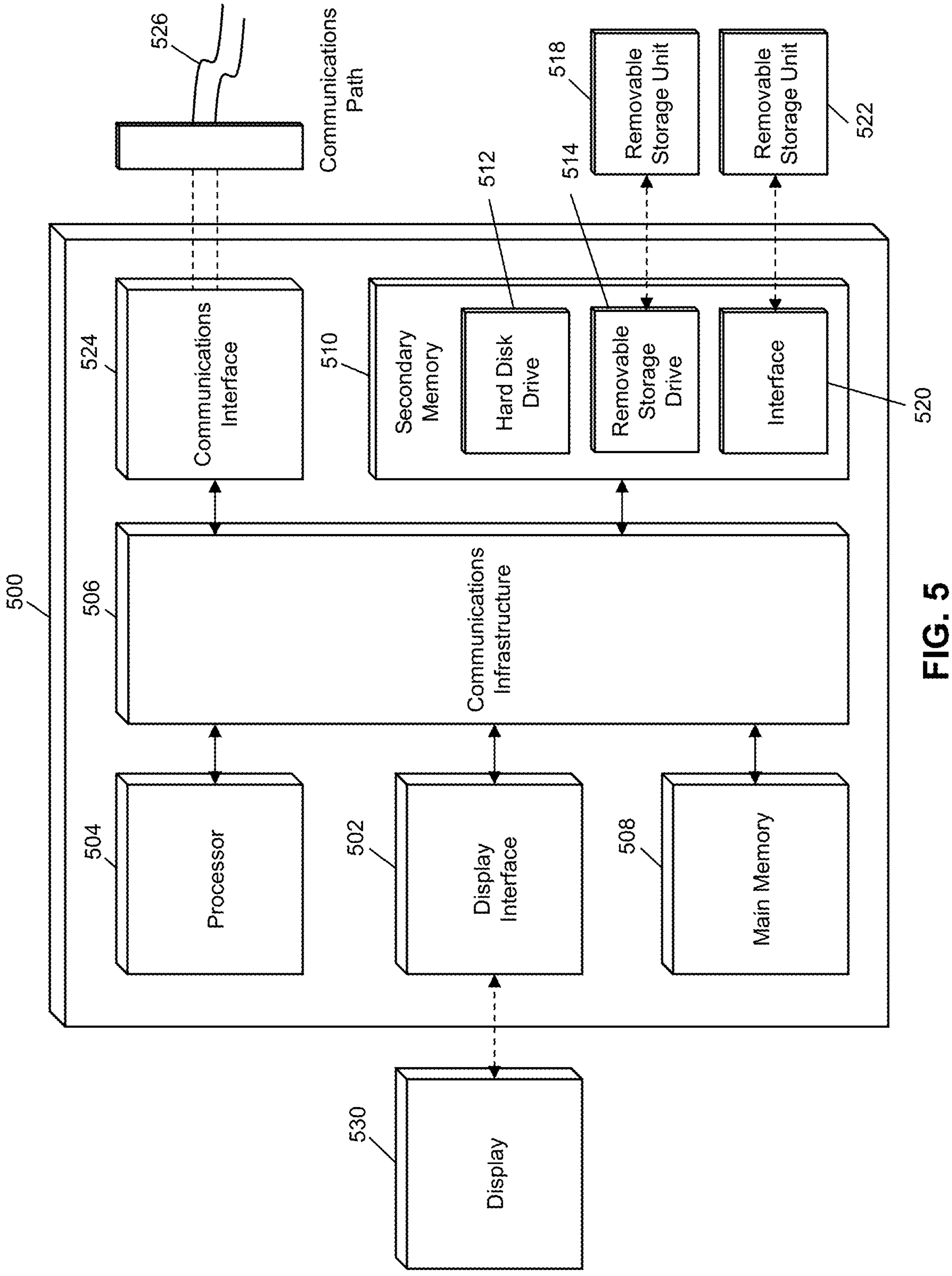
FIG. 5 is a block diagram illustrating a computer system architecture in accordance with exemplary embodiments.

FIG. 5 illustrates a computer system 500 in which embodiments of the present disclosure, or portions thereof, can be implemented as computer-readable code. For example, the processing server 102, service systems 106, client systems 108, and computing devices 110 can be implemented in the computer system 500 using hardware, non-transitory computer readable media having instructions stored thereon, or a combination thereof and can be implemented in one or more computer systems or other processing systems. Hardware can embody modules and components used to implement the methods of FIGS. 3 and 4.

If programmable logic is used, such logic can execute on a commercially available processing platform configured by executable software code to become a specific purpose computer or a special purpose device (e.g., programmable logic array, application-specific integrated circuit, etc.). A person having ordinary skill in the art can appreciate that embodiments of the disclosed subject matter can be practiced with various computer system configurations, including multi-core multiprocessor systems, minicomputers, mainframe computers, computers linked or clustered with distributed functions, as well as pervasive or miniature computers that can be embedded into virtually any device. For instance, at least one processor device and a memory can be used to implement the above described embodiments.

A processor unit or device as discussed herein can be a single processor, a plurality of processors, or combinations thereof. Processor devices can have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations can be described as a sequential process, some of the operations can in fact be performed in parallel, concurrently, and/or in a distributed environment, and with program code stored locally or remotely for access by single or multi-processor machines. In addition, in some embodiments the order of operations can be rearranged without departing from the spirit of the disclosed subject matter.

Processor device 504 can be a special purpose or a general purpose processor device specifically configured to perform the functions discussed herein. The processor device 504 can be connected to a communications infrastructure 506, such as a bus, message queue, network, multi-core message-passing scheme, etc. The network can be any network suitable for performing the functions as disclosed herein and can include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 can also include a main memory 508 (e.g., random access memory, read-only memory, etc.), and can also include a secondary memory 510. The secondary memory 510 can include the hard disk drive 512 and a removable storage drive 514, such as a floppy disk drive, a magnetic tape drive, an optical disk drive, a flash memory, etc.

The removable storage drive 514 can read from and/or write to the removable storage unit 518 in a well-known manner. The removable storage unit 518 can include a removable storage media that can be read by and written to by the removable storage drive 514. For example, if the removable storage drive 514 is a floppy disk drive or universal serial bus port, the removable storage unit 518 can be a floppy disk or portable flash drive, respectively. In one embodiment, the removable storage unit 518 can be non-transitory computer readable recording media.

In some embodiments, the secondary memory 510 can include alternative means for allowing computer programs or other instructions to be loaded into the computer system 500, for example, the removable storage unit 522 and an interface 520. Examples of such means can include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) can be stored on any type of suitable computer readable media, such as optical storage (e.g., a compact disc, digital versatile disc, Blu-ray disc, etc.) or magnetic tape storage (e.g., a hard disk drive). The data can be configured in any type of suitable database configuration, such as a relational database, a structured query language (SQL) database, a distributed database, an object database, etc. Suitable configurations and storage types will be apparent to persons having skill in the relevant art.

The computer system 500 can also include a communications interface 524. The communications interface 524 can be configured to allow software and data to be transferred between the computer system 500 and external devices. Exemplary communications interfaces 524 can include a modem, a network interface (e.g., an Ethernet card), a communications port, a PCMCIA slot and card, etc. Software and data transferred via the communications interface 524 can be in the form of signals, which can be electronic, electromagnetic, optical, or other signals as will be apparent to persons having skill in the relevant art. The signals can travel via a communications path 526, which can be configured to carry the signals and can be implemented using wire, cable, fiber optics, a phone line, a cellular phone link, a radio frequency link, etc.

The computer system 500 can further include a display interface 502. The display interface 502 can be configured to allow data to be transferred between the computer system 500 and external display 530. Exemplary display interfaces 502 can include high-definition multimedia interface (HDMI), digital visual interface (DVI), video graphics array (VGA), etc. The display 530 can be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium can refer to memories, such as the main memory 508 and secondary memory 510, which can be memory semiconductors (e.g., DRAMs, etc.). These computer program products can be means for providing software to the computer system 500. Computer programs (e.g., computer control logic) can be stored in the main memory 508 and/or the secondary memory 510. Computer programs can also be received via the communications interface 524. Such computer programs, when executed, can enable computer system 500 to implement the present methods as discussed herein. In particular, the computer programs, when executed, can enable processor device 504 to implement the methods illustrated by FIGS. 3 and 4, as discussed herein. Accordingly, such computer programs can represent controllers of the computer system 500. Where the present disclosure is implemented using software, the software can be stored in a computer program product and loaded into the computer system 500 using the removable storage drive 514, interface 520, and hard disk drive 512, or communications interface 524.

The processor device 504 can comprise one or more modules or engines configured to perform the functions of the computer system 500. Each of the modules or engines can be implemented using hardware and, in some instances, can also utilize software, such as corresponding to program code and/or programs stored in the main memory 508 or secondary memory 510. In such instances, program code can be compiled by the processor device 504 (e.g., by a compiling module or engine) prior to execution by the hardware of the computer system 500. For example, the program code can be source code written in a programming language that is translated into a lower level language, such as assembly language or machine code, for execution by the processor device 504 and/or any additional hardware components of the computer system 500. The process of compiling can include the use of lexical analysis, preprocessing, parsing, semantic analysis, syntax-directed translation, code generation, code optimization, and any other techniques that can be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for auditing for billing compliance through artificial intelligence. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or can be acquired from practicing of the disclosure, without departing from the breadth or scope.

What is claimed is:

1. A method for auditing for billing compliance through artificial intelligence, comprising:

training, by processor of a processing server, an artificial intelligence (AI) engine, using one or more data files comprising one or more billing guidelines;

receiving, by a receiver of the processing server, one or more billing entries, each of the one or more billing entries including at least a reference identifier, an amount, and a description;

instructing, by the processor of the processing server, the AI engine to audit the one or more billing entries entry using the one or more billing guidelines;

receiving, by the receiver of the processing server, a notification from the AI engine that includes at least one issue of noncompliance and at least one of the one or more billing guidelines associated with the at least one issue of noncompliance;

receiving, by the receiver of the processing server from a user, a request for a recommended modification for the at least one issue of noncompliance;

instructing, by the processor of the processing server, the AI engine to generate the recommended modification for the at least one issue of noncompliance, the recommended modification being in compliance with the one or more billing guidelines;

receiving, by the receiver of the processing server, the recommended modification from the AI engine;

prompting, by the processor of the processing server and for the at least one issue of noncompliance in the received notification, the user for acceptance of the recommended modification or entry of a user-provided modification;

updating, by the processor of the processing server, the one or more billing entries based on a result of the prompting for the at least one issue of noncompliance; and submitting, by a transmitter of the processing server, the updated one or more billing entries for payment.

2. The method of claim 1, wherein the one or more billing entries comprise an invoice.

3. The method of claim 1, wherein the amount is one of: a total payment amount, a payment rate, and a number of time units worked.

4. The method of claim 1, further comprising:

generating, by the processor of the processing server, an invoice including a plurality of billing entries including a common reference identifier, wherein the plurality of billing entries includes the updated one or more billing entries, and submitting the updated one or more billing entries comprises submitting the generated invoice including the updated one or more billing entries.

5. The method of claim 1, wherein the reference identifier is one of: an invoice number, a customer number, and a billing code.

6. The method of claim 1, wherein the notification further includes an indication that the billing entry is ineligible for compensation at the included amount due to the at least one issue of noncompliance.

7. The method of claim 1, wherein the AI engine includes a descriptor for the recommended modification for the at least one issue of noncompliance indicating how the recommended modification is in compliance with the associated one or more billing guidelines.

8. The method of claim 1, further comprising:

repeating the instructing step after updating the billing entry; and continuing to repeat the receiving, receiving, instructing, receiving, prompting, and updating steps until a notification is received from the AI engine indicating no remaining issues of noncompliance.

9. The method of claim 8, wherein repeating the instructing step after updating the billing entry occurs only when entry of a user-provided modification is performed during prompting.

10. A system for auditing for billing compliance through artificial intelligence, comprising:

an artificial intelligence (AI) engine; and a processing server including at least a receiver, a processor, and a transmitter, wherein the processor of the processing server trains the AI engine using one or more data files comprising one or more billing guidelines, the receiver of the processing server receives one or more billing entries, each of the one or more billing entries including at least a reference identifier, an amount, and a description, the processor of the processing server instructs the AI engine to audit the one or more billing entries using the one or more billing guidelines, the receiver of the processing server receives a notification from the AI engine that includes at least one issue of noncompliance and at least one of the one or more billing guidelines associated with the at least one issue of noncompliance, the receiver of the processing server receiving, from a user, a request for a recommended modification for the at least one issue of noncompliance;

the processor of the processing server instructing the AI engine to generate the recommended modification for the at least one issue of noncompliance, the recommended modification being in compliance with the one or more billing guidelines;

the receiver of the processing server receiving the recommended modification from the AI engine;

the processing server of the processing server prompts, for the at least one issue of noncompliance in the received notification, the user for acceptance of the recommended modification or entry of a user-provided modification, and updates the one or more billing entries based on a result of the prompting for the at least one issue of noncompliance, and the transmitter of the processing server submits the updated one or more billing entries for payment.

11. The system of claim 10, wherein the one or more billing entries comprise an invoice.

12. The system of claim 9, wherein the amount is one of: a total payment amount, a payment rate, and a number of time units worked.

13. The system of claim 10, wherein the processor of the processing server generates an invoice including a plurality of billing entries including a common reference identifier, the plurality of billing entries includes the updated one or more billing entries, and submitting the updated one or more billing entries comprises submitting the generated invoice including the updated one or more billing entries.

14. The system of claim 10, wherein the reference identifier is one of: an invoice number, a customer number, and a billing code.

15. The system of claim 10, wherein the notification further includes an indication that the billing entry is ineligible for compensation at the included amount due to the at least one issue of noncompliance.

16. The system of claim 10, wherein the AI engine includes a descriptor for the recommended modification for the at least one issue of noncompliance indicating how the recommended modification is in compliance with the associated one or more billing guidelines.

17. The system of claim 10, wherein the processing server repeats the instructing step after updating the billing entry, and continues to repeat the receiving, receiving, instructing, receiving, prompting, and updating steps until a notification is received from the AI engine indicating no remaining issues of noncompliance.

18. The system of claim 17, wherein repeating the instructing step after updating the billing entry occurs only when entry of a user-provided modification is performed during prompting.

19. A method for auditing for billing compliance through artificial intelligence, comprising:

receiving, by a receiver of the processing server, a billing entry including at least a reference identifier, an amount, and a description;

instructing, by the processor of the processing server, the AI engine to audit the billing entry using one or more billing guidelines, wherein the instructing includes:

generating, by the processor of the processing server, an input query that includes the billing entry and the billing guidelines, and inputting, by the processor of the processing server, the generated input query into the AI engine;

receiving, by the receiver of the processing server, a notification from the AI engine that includes at least one issue of noncompliance, at least one of the one or more billing guidelines associated with the at least one issue of noncompliance, and at least one recommended modification for the at least one issue of noncompliance;

prompting, by the processor of the processing server and for the at least one issue of noncompliance in the received notification, a user for acceptance of one of the at least one recommended modification or entry of a user-provided modification;

updating, by the processor of the processing server, the billing entry based on a result of the prompting for the at least one issue of noncompliance; and submitting, by a transmitter of the processing server, the updated billing entry for payment.

20. The method of claim 19, further comprises:

receiving, by the receiver of the processing server, past billing data including one or more previously accepted billing entries; and wherein the input query further includes the past billing data.

21. The method of claim 20, further comprising:

storing, by the processor of the processing server, the billing entry, the billing guidelines, and the past billing data in a database; and wherein, the generating the input query includes:

querying, by the processor of the processing server, the database to retrieve the billing entry, the billing guidelines, and the past billing data, and retrieving, by the processor of the processing server, the billing entry, the billing guidelines, and the past billing data.

* * * * *